United States Patent
Kato et al.

[11] 3,849,109
[45] Nov. 19, 1974

[54] MIXED HERBICIDE COMPOSITION

[75] Inventors: Yoshiro Kato, Fukuoka; Masaru Kado, Kanagawa, both of Japan

[73] Assignees: Mitsui Toatsu Chemicals Inc.; Kumiai Chemical Industry Co., Ltd., both of Tokyo, Japan

[22] Filed: Apr. 24, 1970

[21] Appl. No.: 31,777

[30] Foreign Application Priority Data
Apr. 24, 1969 Japan................................ 44-31282

[52] U.S. Cl............................. 71/100, 71/88, 71/94, 71/124
[51] Int. Cl................................................ A01n 9/12
[58] Field of Search ................. 71/124, 88, 100, 94

[56] References Cited
UNITED STATES PATENTS
2,992,091  7/1961  Harman et al. ...................... 71/100
3,401,031  9/1968  Inove et al. ........................... 71/124

*Primary Examiner*—Lewis Gotts
*Assistant Examiner*—Catherine L. Mills
*Attorney, Agent, or Firm*—Sughrue, Rothwell, Mion, Zinn and Macpeak

[57] ABSTRACT

A mixed herbicide composition consisting of a thiocarbamate compound represented by the general formula:

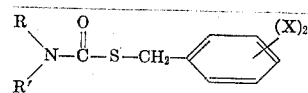

(wherein R, R' are each hydrogen atoms, lower alkyl groups, lower alkenyl groups, or R and R' may together form a hetero ring with a nitrogen atom, a halogen atom, a methyl group of a lower alkoxy group, and X may be a combination of different atoms or group) and 4-nitro-2',4',6'-trichlorodiphenyl ether or 4-nitro-2',4'-dichloro-6-fluorodiphenyl ether as the active ingredients, and a method for controlling germination of weeds in farm-lands and paddy fields employing such compositions.

10 Claims, No Drawings

MIXED HERBICIDE COMPOSITION

The present invention relates to a novel mixed herbicide composition and a method for applying the same. An object of the present invention is to provide a herbicide which can strongly inhibit germination of various weeds on farming lands and control germination of weeds on farmland and paddy fields by the application of merely a small quantity thereof.

Furthermore, the present invention is concerned with a novel herbicide composition for broad herbicidal application, which comprises a mixture of a thiocarbamate compound represented by the general formula:

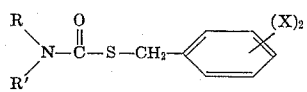

(wherein R, R' are each hydrogen atoms, lower alkyl groups, lower alkenyl groups; or R and R' together may form a hetero ring with a nitrogen atom; X represents hydrogen, halogen, methyl or lower alkoxy and wherein X may be a combination of different atoms or groups) with 4-nitro-2',4',6'-trichlorodiphenyl ether (hereinafter, referred to as CNP) or 4-nitro-2',4'-dichloro-6'-fluorodiphenyl ether (hereinafter referred to as NCFE) as the active ingredient and an inert carrier.

The present invention makes it possible to add a growing period-treatment to previous treatments with known germination inhibitors, thereby widening the period of treatment against weeds between germinating and growing periods.

Thus, for example, the compositions of the present invention are non-selective and control completely perennial weeds such as Cyperus serotinus, which have not hitherto been inhibited by chemical treatment during the growing of aquatic rice plants, as well as controlling general broad-leaved weeds such as Panicum crusgalli, Cyperus microiria, Monochoria vaginalis var.plantaginea and the like without danger of phytoxicity against rice plants or poisoning of fish.

Recently, there have been developed and applied various kinds of herbicides. Thus, for example, pentachlorophenol (hereinafter referred to as PCP), which is widely used as a herbicide in paddy fields, is effective to control Giamineae weeds such as Panicum crusgalli, Digitaria sanguinalis and annual broad-leaved weeds such as Monochoria vaginalis va. plantaginea, Elatinaceae and the like, but cannot control perennial weeds such as Cyperus serotinus and the like.

Also, 2,4-dichlorophenoxyacetic acid and its salts (hereinafter, referred to as 2,4-D) are effective to control broad-leaved weeds such as Monochoria vaginalis var. plantaginea, but similarly to PCP are not effective against Giamineae weeds such as Panicum crusgalli and perennial weeds such as Eleocharis acicularis var. longiseta, Cyperus serotinus and the like. The continuous uses of said PCP and 2,4-D have recently tended to favor the growth of said perennial weeds in paddy fields, thereby inhibiting the growth of aquatic rice plants. The farmer is therefore very anxious to control such weeds.

Since many Eleocharis acicularis plants germinate from period of scarifying of seedlings to about 2 weeks after rice-transplantation, it is very difficult to pinpoint the precise period of the treatment. PCP and 4-nitro-2', 4'-dichlorodiphenyl ether (referred to as NIP) are useful during the initial germination period of the weeds, but their effects are reduced remarkably if used during the growing period. Thus, their use past 10 days after rice-transplantation does not provide sufficient desired herbicidal effects. Even if the herbicidal effect is obtained by early treatment, it is impossible to control weeds which germinate after 10 days after rice-transplantation.

In view of the above facts, the most effective and ideal controlling period, namely, period of treatment with herbicide in paddy fields may be the period during which the weeds are growing uniformly. However, there have hitherto been no herbicides available which are satisfactory for such purpose. In view of the recent farm labor shortage and the reasonable division of labor at the period of rice-transplantation, it is necessary to develop a herbicide which is capable of controlling weeds germinating during the entire period by a single treatment.

One ingredients, CNP, of the compositions of the present invention is a contact type herbicide similar to the other diphenyl ether herbicides, and its application during a period extending from before the germination of the weeds to the initial period of germination, is remarkably effective against Giamineae and annual broad-leaved weeds. The effect is gradually decreased in accordance with the extent of growth of the weeds. Further, no effects are obtained, similarly to other diphenyl ether compounds, against perennial weeds, such as Eleocharis acicularis var. longiseta, Potamogeton distinctus and Alisma canaliculatum.

To be effective, therefore, application should take place within a period from 5 days before to 5 days after rice-transplantation. Therefore, adequate control of weeds growing 15-20 days after rice-transplantation may not be possible.

As a result of many attempts to develop a herbicide capable of non-selectively controlling weeds, applicants have been successful in developing a novel herbicide comprising CNP or NCFE and a thiocarbamate compound, represented by the foregoing general formula, for example a colorless liquid S-(4-chlorobenzyl)-N,N-di-ethyl-thiocarbamate with a b.p. of 127–131/0.12 mmHg, producable by the following procedure.

15.9g (0.1 mole) Of 4-chlorobenzyl mercaptan was dissolved in 50 ml. of benzene, and 5.8g (0.1 mole) of 40% sodium-toluene suspension was added at room temperature. The mixture was then stirred for 30 minutes at 70-80°C. At that time, a sodium salt of 4-chlorobenzyl mercaptan was formed. Then, 13.6g (0.1 mole) of N,N-diethylcarbamoyl chloride was dissolved in 80 ml. of benzene, and the aforesaid suspension of the sodium salt of 4-chlorobenzyl mercaptan was gradually added to the solution while stirring at room temperature. After the addition, the mixture was directly stirred and heat-stirred for 2 hours at reflux.

After the reaction, the precipitate was removed by filtration and the filtrate condensed. The so-obtained liquid was then subjected to a reducing distillation, thereby obtaining 19.8g (78% of theoretical yield) of a colorless liquid S-(4-chlorobenzyl)-N,N'-diethyl thiocarbamate (referred to as CBDC hereinafter) having a b.p. of 127–131°C/0.12 mmHg and refractive index, $n_D^{25} = 1.558$. This compound has a strong herbicidal activity itself, and is effective when applied during a period from just after rice-transplantation to about 7 days past the transplantation, its activity being inferior to control weeds after that time. Its use in admixture with said other ingredient for example, in an amount less than one-fifth in the case of using each ingredient alone makes it possible to control effectively and completely Eleocharis acicularis var. longiseta which has hitherto proved difficult to control, as well as annual weeds, such as Panicum crusgalli, Cyperus microiria, Monochoria vaginalis var. plantaginea and the like.

Also, there is to be considered the phenomena of phytotoxicity and inhibition of growing rice plants at the time of treating with a single compound at high dosages, causing browning and breaking of aquatic rice plants in the case of deep water. Furthermore, the primary thrust of the present invention is the widening of the period over which treatment may take place. Thus, for example, in a suitable period between just after rice-transplantation and 20 days after the transplantation, it is possible to completely effect the control of weeds by application of the compositions of this invention.

In addition, treatment before or after rice-transplantation is, of course, sufficient in effect for the control of such weeds. Moreover, as a result of many investigations directed to the purpose of increasing the residual effect of CNP or NCFE and delaying period of the chemical treatment, that is, making possible the use thereof at a suitable period after rice-transplantation and obtaining precise herbicidal effects without regard to water depth, applicants have found that mixture of CNP or NCFE with compounds represented by the following formulae are synergistically superior in herbicidal activity.

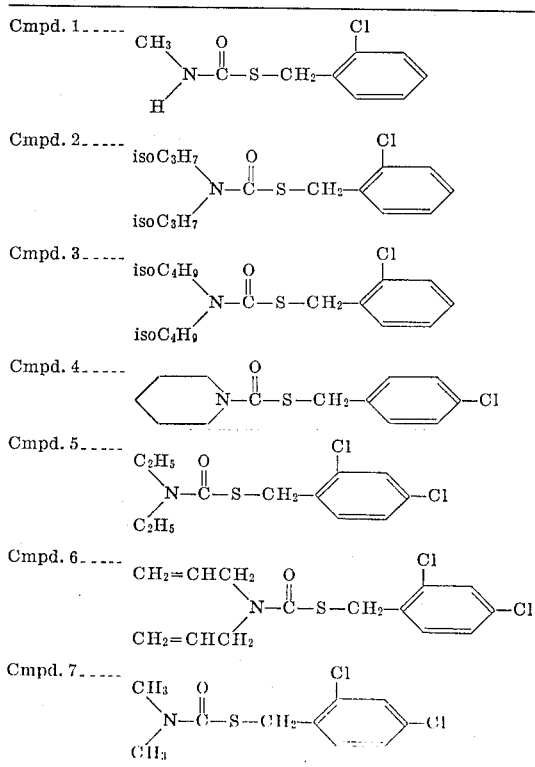

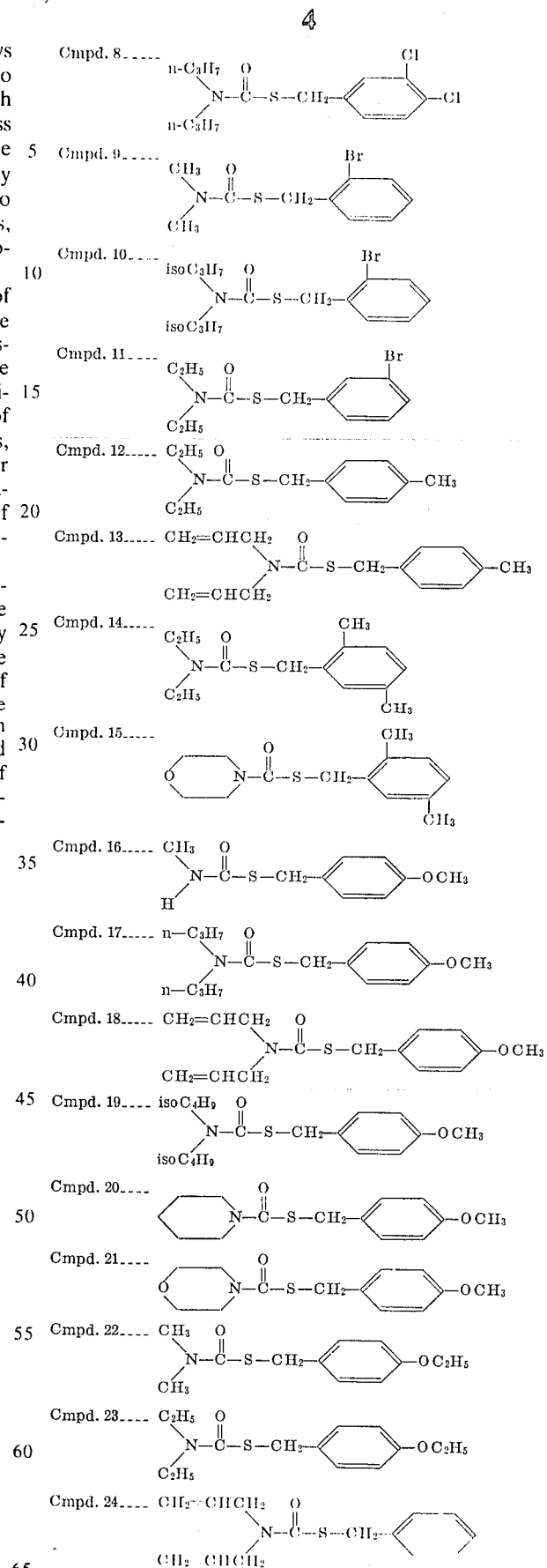

(In addition, the compound numbers of the aforesaid formulae are referred hereinafter).

These compounds can generally be produced according to one of the following reaction schemes:

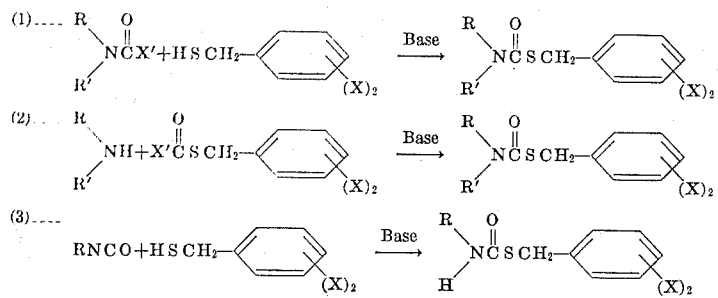

wherein $X$ is a halogen atom, and the base is sodium, potassium and a general dehalogenating agent such as dimethyl aniline, triethylamine or the like.

These compounds have herbicidal activity themselves, and are effective during a period between just after rice-transplantation and 7–10 days after the transplantation. On the other hand, a precise herbicidal effect during a period between just after rice-transplantation and 20 days after the transplantation can be achieved by using these compounds together with CNP or NCFE. Especially, such compositions not only have a remarkable herbicidal effect on Panicum crusgalli at the 2nd – 3rd foliage period, when control is very difficult, but also shows good eradication of Eleocharis acicularis var. longiseta which is often difficult to kill by means of CNP alone. The above applies as well to the case of annual broad-leaved weeds generally, and the present invention makes complete herbicidal effects possible by the treatment thereof after generation of weeds which have never been adequately controlled previously.

The use of the herbicide compositions of the present invention during the latter period after rice-transplantation is not only desirable from the point of division of labor, but also provides the following advantages:

1. no danger of lack of rooting of aquatic rice plants because of phtoxicity,
2. an elongated period of controlling weeds,
3. prevention of eluviation of chemicals, as compared with early treatment, in accordance with the gradual reduction of leakage of water,
4. the possibility of air-spraying the chemicals which has been hitherto impossible because of the short application period.

As mentioned above, the present invention is safe to aquatic rice plants at the time of complete weed-control by treatment with high dosages of the chemicals and is effective against grown weeds. That is, the compositions of the invention are characterized by an elongated application period. Such characteristics have never been realized by employment of the hitherto known herbicides. Although the exact mechanism of action of the compositions of this invention has not been determined, the superiority obtained is believed to be due to the formation of a stable soil-treating layer as a result of mixing the thiocarbamate compound having the aforesaid general formula with CNP or NCFE.

It is desirable to employ the components in a proportion of thiocarbamate compound to CNP or NCFE, of 1:0.3–3 parts by weight and, particularly, the maximum effect is obtained at a ratio near 1:1.

The compositions of the invention can be prepared by incorporating solid carriers such as bentonite, clay and talc or a binder, or an inert carrier such as surfactant, to the thiocarbamate and diphenyl ether.

The most effective formulation of the present composition is granules. These are produced by diluting the active ingredients with inert solid carriers such as bentonite, clay, talc and lime, kneading with a binder selected from the group consisting of sodium alkyl benzene sulfonate, polyvinyl alcohol (PVA) and sodium lignine sulfonate, together with water, extrusiongranulizing and thereafter drying and/or by dissolving the active ingredients in a proper solvent and absorbing them uniformly into granular diatomaceous earth and vermiculite.

In use, said granules can be scattered uniformly by hand or by a machine and a helicopter. However, in some cases, it may, of course, be possible to employ the active ingredients in a wettable powder by mixing with an inert solid carrier and surfactant, in an emulsion comprising a solvent with a surfactant, or in a powder by mixing an inert solid carrier directly or after diluting with water. It is also possible to mix the compositions of this invention with insecticides, fungicides or other herbicides.

Accordingly, in the preparation of compositions of this invention, 50 to 500 g of thiocarbamate compound are preferably mixed with 50 to 500 g of CNP or NCFE and such compositions may then be applied over 10 arcs. When employing granules prepared in accordance with the above, an application rate of 1 to 8 kg, preferably 3 to 6 kg may be employed.

The following examples will serve to more specifically illustrate the present invention. "%", as used in the examples is intended to designate weight percentage. All other proportions recited are by weight unless otherwise indicated.

EXAMPLE 1 — GRANULES

7% of CBDC, 7% of CNP, 2% of sodium lignine sulfonate, 5% of white carbon and 9% of bentonite were uniformly crushed, mixed, kneaded with a suitable amount of water and then granulized by means of an extrusion granulizer, dried and thereafter conducted to 14–32 mesh to prepare the granular formulation.

EXAMPLE 2 — GRANULES

10% of CBDC, 5% of CNP, 48% of gentonite, 35.5% of clay, 1% of sodium alkyl benzenesulfonate and 0.5% of PVA were uniformly crushed and mixed, and a suitable amount of water was added. The mixture was made into a granular formulation in the same manner as in Example 1.

EXAMPLE 3 — GRANULES 5.0% of CBDC, 7.5% of CNP, 40% of calcium bicarbonate, 44.5% of clay, 1% of sodium alkyl benzenesulfonate and 2% of sodium lignine sulfonate were prepared into a granular formulation in the same manner as in Example 1.

EXAMPLE 4 — GRANULES

5% of CBDC, 6% of CNP, 40% of calcium bicarbonate, 45.5% of clay, 1.5% of sodium alkyl benzenesulfonate, and 2% of sodium lignine sulfonate were crushed and mixed to make a granular formulation in the same manner as in Example 1.

EXAMPLE 5 — GRANULES

5% of CBDC, 5% of CNP, 38% of clay, 1.5% of calcium alkyl benzene sulfonate, 50% of bentonite and 0.5% of PVA were crushed and mixed to prepare a granular formulation in the same manner as in Example 1.

EXAMPLE 6 — GRANULES 1.5% of CBDC, 1.5% of CNP, 50% of bentonite, 5.5% of clay, 1% of sodium alkylbenzene sulfonate and 0.5% of PVA were uniformly crushed, mixed, and blended together with a suitable amount of water, thereafter granulized by means of an extrusion granulizer, and dried to make a granular formulation of 14–32 mesh particle size.

EXAMPLE 7 — GRANULES

5% of a solution obtained by melting CNP with a five-fold amount (by weight) of DMF, and 5% of CBDC were uniformly absorbed into 90% of granular diatomaceous earth of 8–32 mesh particle size to make a granular formulation.

EXAMPLE 8 — POWDER

10% of CBDC, 5% of CNP and 85% of a 1:1 mixture of diatomaceous earth with clay were crushed and mixed to make a powder. It was used as powder.

EXAMPLE 9 — WETTABLE POWDER

I. 20% of CBDC and 10% of white carbon (Colloidal silica) are blended in a ribbon blender for a 15 minutes.

II. 20% of CNP, 2% of sodium alkylbenzenesulfonate, 2% of DEMOL N (Registered Trade Mark; sodium salt of condensed naphthalene sulfonic acid, produced by KAO ATLAS CO., LTD.) and 56% of diatomaceous earth are also blended in a ribbon blender for 20 minutes and are then ground in an air mill to a particle size less than 10 microns minutes.

The products of I and II are blended in a tumbler blender and then fed into a pulverizer and ground using a 0.045 screen. In use, the blend was applied after dilution with 10 to 100 l of water.

EXAMPLE 10 — EMULSION

25% of CBDC, 15% of CNP and 45% of xylene are dissolved in a mix tank with propeller type agitator for a 20 minutes. SORPOL (Registered Trade Mark; Emulsifier consisting of admixture of polyoxyethylene alkylarylether (nonionic surfactant) and a salt of alkylarylsulfonate (anionic surfactant) produced by TOHO CHEMICAL INDUSTRIAL CO., LTD.) is then added. The admixture is mixed until it is dissolved perfectly. In use, it was sprayed after dilution with 10 to 100 l of water.

EXAMPLE 11 — GRANULES

7% of compound (1), 7% of CNP, 2% of sodium lignin sulfonate, 5% of white carbon, 79% of bentonite were uniformly crushed, mixed, and blended with a suitable amount of water, granulized by means of an extrusion granulizer, dried to prepare a granular formulation having 14–32 mesh.

EXAMPLE 12 — GRANULES

10% of compound (2), 5% of CNP, 48% of bentonite, 35.5% of clay, 1% of sodium alkyl benzene sulfonate and 0.5% of PVA were uniformly crushed and mixed, then blended with a suitable amount of water and granulized in the same manner as in Example 11.

EXAMPLE 13 — GRANULES

5% of compound (2), 7.5% of CNP, 40% of calcium bicarbonate, 44.5% of clay, 1% of sodium alkylbenzene sulfonate and 2% of sodium lignine sulfonate were treated in the same manner as in Example 11, to make a granular formulation.

EXAMPLE 14 — GRANULES

5% of compound (5), 6% of CNP, 40% of calcium bicarbonate, 45.5% of clay, 1.5% of sodium alkylbenzene sulfonate, and 2% of sodium lignine sulfonate were crushed and mixed in the same manner as in Example 11.

EXAMPLE 15 — GRANULES

5% of compound (6), 5% of CNP, 38% of clay, 1.5% of calcium alkylbenzene sulfonate, 50% of bentonite and 0.5% of PVA were crushed and mixed to make a granular formulation in the same manner as in Example 11.

EXAMPLE 16 — GRANULES 1.5% of compound (5), 1.5% of CNP, 50% of bentonite, 45.5% of clay, 1% of sodium alkylbenzene sulfonate, and 0.5% of PVA were uniformly crushed, mixed, and blended with a suitable amount of water, granulized by means of an extrusion granulizer, and dried to prepare a granular formulation with 14–32 mesh.

EXAMPLE 17 — GRANULES

5% of solution, obtained by melt-dissolving compound (1) in a 5-fold amount (by weight) of DMF, and 5% of CNP were uniformly absorbed into granular diatomaceous earth with 8–32 mesh to make a granular formulation.

EXAMPLE 18 — GRANULES

10% of compound (6), 5% of CNP, and 85% of a 1:1 mixture of diatomaceous earth with clay were mixed and crushed. It was scattered as powder.

EXAMPLE 19 — WETTABLE POWDER

10% of compound (9), 10% of CNP, 2% of wetting agent, sodium alkylbenzene sulfonate, 2% of dispersant, DEMOL (Registered Trade Mark, produced by KAO ATLAS CO., LTD.), 10% of white carbon, and 56% of diatomaceous earth were mixed, crushed and diluted with water to prepare a sprayable composition.

EXAMPLE 20 — EMULSION

25% of compound (8), 15% of CNP, 15% of Sorpol (Registered Trademark, produced by Toho Chemical Industrial Co., Ltd.) and 45% of xylol were mixed and dissolved. In use, it is sprayed after dilution with 10 to 100 l of water.

EXPERIMENTAL EXAMPLE 1

Synergistic effect test (1) an initial germination of weed:

Eleocharis acicularis var. longiseta and Panicum crusgalli at germination period, Panicum crusgalli at the first foliage period and the second foliage period, and aquatic rice plant at the third foliage period were respectivley planted in pots having 15 cm in diameter. After flooding to a depth of 3 cm., CNP granules alone, CBDC granules alone and a mixture of CNP and CBDC granules (prepared as in Example 1) were scattered on the respective pots by hand. The amount of generating weeds by number and weight and phytoxicity toward rice plants were determined after 15 days from the treatment. The results were as set forth in Table 1 in which composition No. 3 is of this invention.

an extrusion granulizer, dried, thereafter passed through 14–32 mesh to prepare the granular formulation.

(b) Granule: 7% of CNP (or CBDC), 2% of sodium lignine sulfonate, 5% of white carbon and 84% of bentonite were uniformly crushed, mixed, kneaded with a suitable amount of water, granulized by means of an extrusion granulizer, dried and thereafter passed through 14–32 mesh to prepare the granular formulation. The other single granules are formulated with the method of preparation.

No phytotoxicity toward rice plants was observed in any of the above-tabulated tests. In the above table, each kg/10a of granules used corresponds to 70 g/10a of 7% CNP and/or 7% CBDC.

EXPERIMENTAL EXAMPLE 2

Synergistic effect test (2) on initial germination of weed:

Eleocharis acicularis var. longiseta and Panicum crusgalli at germination period, Panicum crusgalli at the first foliage period and the second foliage period, and aquatic rice plant at the third foliage period were respectively planed in pots having 15 cm in diameter. After flooding to a depth of 3 cm, CNP granules alone, thiocarbamate granules alone and a mixture of CNP and thiocarbamate granules (formulated as in Examples 14 and 15) were scattered on the respective pots. Numbers and weights of generating weeds and phytox- Table 1

| No. | Sample Chemicals | Amount used- (granules) kg/10a | Number of Eleocharis acicularis var. longiseta | Weight of Panicum crusgalli (g) Treating at germination period | Treating at 1st foliage period | Treating at 2nd foliage period |
|---|---|---|---|---|---|---|
| 1(b) | 7% CNP | 0.5 | 61 | 1.8 | 1.8 | 7.5 |
| | 7% CNP | 1.0 | 50 | 0 | 1.6 | 6.4 |
| | 7% CNP | 1.5 | 36 | 0 | 0.6 | 4.3 |
| | 7% CNP | 2.0 | 12 | 0 | 0.3 | 3.8 |
| 2(b) | 7% CBDC | 0.5 | 29 | 0.3 | 2.2 | 6.2 |
| | 7% CBDC | 1.0 | 20 | 0 | 1.4 | 4.6 |
| | 7% CBDC | 1.5 | 16 | 0 | 0.6 | 4.3 |
| | 7% CBDC | 2.0 | 3 | 0 | 0.5 | 3.8 |
| 3 | Mixture of 7% CNP and 7% CBDC | 0.5 | 2 | 0 | 1.2 | 3.0 |
| | do. | 1.0 | 0 | 0 | 0 | 0.5 |
| | do. | 1.5 | 0 | 0 | 0 | 0 |
| 4 | Control(a) | 2,0(−) | 84 | 1.9 | 2.2 | 9.4 |
| 5 | Non-treatment | | 81 | 2.1 | 2.3 | 9.3 |

(a) Granules: 2% of sodium lignine sulfonate, 5% of while carbon (colloidal silica) and 93% of bentonite were uniformly crushed, mixed, kneaded with a suitable amount of water, granulized by means of icity of rice plant after 15 days were investigated, and the results were as in Tables 2 and 3, in which the compositions of this invention are Nos. 7–21 and 6–10, respectively.

Table 2

| No. | Sample Chemicals | Amount used (granules) kg/10a | Number of Eleocharis acicularis var. longiseta | Weight of Panicum crusgalli (g) Treating at germination period | Treating at 1.5 foliage period | Treating at 3rd foliage period | Phytoxicity to rice plants |
|---|---|---|---|---|---|---|---|
| 1 | CNP 10% | 1 (100)(a) | 61 | 2.0 | 4.2 | 9.0 | no |
| | CNP 10% | 2 (200) | 46 | 1.4 | 3.3 | 7.0 | no |
| | CNP 10% | 3 (300) | 30 | 1.2 | 2.3 | 6.0 | no |
| 2 | Compound 2 — 7% | 1 (70) | 26 | 1.6 | 3.0 | 10.6 | no |
| | do. | 2 (140) | 12 | 0.7 | 2.2 | 7.6 | no |
| | do. | 3 (210) | 0 | 0.1 | 1.3 | 4.3 | no |

Table 2—Continued

| No. | Sample Chemicals | Amount used (granules) kg/10a | Number of Eleocharis acicularis var. longiseta | Weight of Panicum crusgalli (g) | | | Phytoxicity to rice plants |
|---|---|---|---|---|---|---|---|
| | | | | Treating at germination period | Treating at 1.5 foliage period | Treating at 3rd foliage period | |
| 3 | Compound 3 — 7% | 1 (70) | 30 | 1.6 | 3.3 | 9.2 | no |
| | do. | 2 (140) | 12 | 0.7 | 2.1 | 6.8 | no |
| | do. | 3 (210) | 0 | 0.1 | 0.4 | 3.9 | no |
| 4 | Compound 6 — 7% | 1 (70) | 28 | 1.0 | 2.8 | 10.5 | no |
| | do. | 2 (140) | 10 | 0.3 | 1.0 | 7.5 | no |
| | do. | 3 (210) | 0 | 0 | 0.1 | 3.0 | no |
| 5 | Compound 10 — 7% | 1 (70) | 29 | 1.1 | 2.8 | 11.0 | no |
| | do. | 2 (140) | 10 | 0.3 | 0.9 | 6.0 | no |
| | do. | 3 (210) | 0 | 0 | 0.2 | 2.0 | no |
| 6 | Compound 15 — 7% | 1 (70) | 28 | 1.2 | 2.4 | 9.0 | no |
| | do. | 2 (140) | 14 | 0.4 | 1.3 | 5.4 | no |
| | do. | 3 (210) | 2 | 0 | 0.7 | 3.4 | no |
| 7 | Mixture (Ex. 15) CNP 5% Compound 1 — 5% | 1 (50:50)(b) | 4 | 0.2 | 0.2 | 0.7 | no |
| | | 2 (100:100) | 0 | 0 | 0 | 0.2 | no |
| | | 3 (150:150) | 0 | 0 | 0 | 0 | no |
| 8 | Mixture (Ex. 15) CNP 5% Compound 2 — 5% | 1 (50:50) | 4 | 0.2 | 0.2 | 0.8 | no |
| | | 2 (100:100) | 1 | 0 | 0 | 0.3 | no |
| | | 3 (150:150) | 0 | 0 | 0 | 0 | no |
| 9 | Mixture (Ex. 15) CNP 5% Compound 3 — 5% | 1 (50:50) | 3 | 0.1 | 0.1 | 0.6 | no |
| | | 2 (100:100) | 0 | 0 | 0 | 0.2 | no |
| | | 3 (150:150) | 0 | 0 | 0 | 0 | no |
| 10 | Mixture (Ex. 15) CNP 5% Compound 4 — 5% | 1 (50:50) | 6 | 0.3 | 0.3 | 1.2 | no |
| | | 2 (100:100) | 0 | 0 | 0 | 0.1 | no |
| | | 3 (150:150) | 0 | 0 | 0 | 0 | no |
| 11 | Mixture (Ex. 15) CNP 5% Compound 5 — 5% | 1 (50:50) | 3 | 0.3 | 0.4 | 1.0 | no |
| | | 2 (100:100) | 0 | 0 | 0.1 | 0.1 | no |
| | | 3 (150:150) | 0 | 0 | 0 | 0 | no |
| 12 | Mixture (Ex. 15) CNP 5% Compound 6 — 5% | 1 (50:50) | 5 | 0.2 | 0.4 | 1.2 | no |
| | | 2 (100:100) | 0 | 0 | 0 | 0.3 | no |
| | | 3 (150:150) | 0 | 0 | 0 | 0 | no |
| 13 | Mixture (Ex. 15) CNP 5% Compound 7 — 5% | 1 (50:50) | 2 | 0.1 | 0.5 | 1.1 | no |
| | | 2 (100:100) | 0 | 0 | 0 | 0.2 | no |
| | | 3 (150:150) | 0 | 0 | 0 | 0 | no |
| 14 | Mixture (Ex. 15) CNP 5% Compound 8 — 5% | 1 (50:50) | 1 | 0.1 | 0.4 | 1.1 | no |
| | | 2 (100:100) | 0 | 0 | 0 | 0.1 | no |
| | | 3 (150:150) | 0 | 0 | 0 | 0 | no |
| 15 | Mixture (Ex. 15) CNP 5% Compound 9 — 5% | 1 (50:50) | 2 | 0.2 | 0.5 | 1.3 | no |
| | | 2 (100:100) | 0 | 0 | 0.1 | 0.3 | no |
| | | 3 (150:150) | 0 | 0 | 0 | 0 | no |
| 16 | Mixture (Ex. 15) CNP 5% Compound 10 — 5% | 1 (50:50) | 4 | 0.3 | 0.3 | 1.2 | no |
| | | 2 (100:100) | 0 | 0 | 0 | 0.1 | no |
| | | 3 (150:150) | 0 | 0 | 0 | 0 | no |
| 17 | Mixture (Ex. 15) CNP 5% Compound 11 — 5% | 1 (50:50) | 2 | 0.1 | 0.3 | 1.0 | no |
| | | 2 (100:100) | 0 | 0 | 0 | 0.2 | no |
| | | 3 (150:150) | 0 | 0 | 0 | 0 | no |
| 18 | Mixture (Ex. 15) CNP 5% Compound 12 — 5% | 1 (50:50) | 4 | 0.3 | 0.5 | 1.2 | no |
| | | 2 (100:100) | 0 | 0 | 0.1 | 0.4 | no |
| | | 3 (150:150) | 0 | 0 | 0 | 0 | no |
| 19 | Mixture (Ex. 15) CNP 5% Compound 13 — 5% | 1 (50:50) | 4 | 0.2 | 0.4 | 1.1 | no |
| | | 2 (100:100) | 1 | 0 | 0 | 0.3 | no |
| | | 3 (150:150) | 0 | 0 | 0 | 0 | no |
| 20 | Mixture (Ex. 15) CNP 5% Compound 14 — 5% | 1 (50:50) | 2 | 0.2 | 0.3 | 1.1 | no |
| | | 2 (100:100) | 0 | 0 | 0 | 0.2 | no |
| | | 3 (150:150) | 0 | 0 | 0 | 0 | no |

Table 2—Continued

| No. | Sample Chemicals | Amount used (granules) kg/10a | Number of Eleocharis acicularis val. longiseta | Weight of Panicum crusgalli (g) Treating at germination period | Weight of Panicum crusgalli (g) Treating at 1.5 foliage period | Weight of Panicum crusgalli (g) Treating at 3rd foliage period | Phytoxicity to rice plants |
|---|---|---|---|---|---|---|---|
| 21 | Mixture (Ex. 15) CNP 5% Compound 15 – 5% | 1 (50:50) 2 (100:100) 3 (150:150) | 3 0 0 | 0.2 0 0 | 0.4 0.1 0 | 1.3 0.3 0 | no no no |
| 22 | Control[c] | 3(-) | 65 | 2.6 | 4.2 | 11.9 | no |
|  | Non-treatment |  | 67 | 2.6 | 4.5 | 12.8 | no |

[a] Amount of active ingredient used in g/10a.
[b] Amount of active ingredient used in g/10a (thiocarbamate : CNP).
[c] Granule; 43% of clay, 1.5% of calcium alkylbenzene sulfonate, 55% of bentonite and 0.5% of PVA were uniformly crushed, mixed, blended with a suitable amount of water, granulized by means of an extrusion granulizer, dried and prepared into a granular formulation having a particle size of 14 – 32 mesh.

Table 3

| No. | Sample Chemicals | Amount used product kg/10a | Number of Eleocharis acicularis var. longiseta | Weight of Panicum crusgalli (g) Treating at germination period | Weight of Panicum crusgalli (g) Treating at 1st foliage period | Weight of Panicum crusgalli (g) Treating at 2nd foliage period |
|---|---|---|---|---|---|---|
| 1 | CNP 7% | 1(70)[a] 2(140) 3(210) | 45 38 32 | 2.1 0.9 0 | 3.4 1.9 0.9 | 9.6 6.3 5.1 |
| 2 | Compound 2 – 7% | 1(70) 2(140) 3(210) | 28 20 8 | 1.3 0.5 0 | 3.1 2.0 0.5 | 6.8 5.0 3.1 |
| 3 | Compound 4 – 7% | 1(70) 2(140) 3(210) | 25 18 6 | 1.1 0.4 0 | 2.9 1.9 0.8 | 7.1 5.2 3.5 |
| 4 | Compound 5 – 7% | 1(70) 2(140) 3(210) | 27 17 5 | 1.5 0.2 0 | 3.5 1.9 0.3 | 8.1 5.3 3.0 |
| 5 | Compound 22 | 1(70) 2(140) 3(210) | 24 17 6 | 1.2 0.2 0 | 3.4 2.0 0.7 | 7.9 5.4 3.8 |
| 6 | Mixture (Ex. 14) CNP 6% Compound 17 – 5% | 1(50:60)[b] 2(100:120) 3(150:180) | 3 0 0 | 0.1 0 0 | 0.9 0.1 0 | 1.8 0.9 0 |
| 7 | Mixture (Ex. 14) CNP 6% Compound 19 – 5% | 1(50:60) 2(100:120) 3(150:180) | 2 0 0 | 0.2 0 0 | 0.8 0.1 0 | 1.5 0.2 1 |
| 8 | Mixture (Ex. 14) CNP 6% Compound 20 – 5% | 1(50:60) 2(100:120) 3(150:180) | 1 0 0 | 0.3 0.1 0 | 1.0 0.4 0 | 2.1 0.7 0 |
| 9 | Mixture (Ex. 14) CNP 6% Compound 22 – 5% | 1(50:60) 2(100:120) 3(150:180) | 1 1 0 | 0.1 0 0 | 0.8 0 0 | 1.5 0.4 0 |
| 10 | Mixture (Ex. 14) CNP 6% Compound 23 – 5% | 1(50:60) 2(100:120) 3(150:180) | 4 0 0 | 0.2 0 0 | 0.9 0 0 | 1.9 0.5 0 |
| 11 | Control[c] | 3(—) | 47 | 2.8 | 4.9 | 10.3 |
|  | Non-treatment | — | 48 | 2.9 | 5.1 | 10.5 |

[a] Amount of active ingredient used in g/10a.
[b] Amount of active ingredient used in g/10a (thiocarbamate : CNP)
[c] Granule; 45% of calcium bicarbonate, 51.5% of clay, 1.5% of sodium alkylbenzene sulfonate, and 2% of sodium lignine sulfonate were uniformly crushed and mixed, and blended with a suitable amount of water, granulized by means of an extrusion granulizer, dried and prepared the granular formulation having 14-32 mesh.

No phytotoxicity toward rice plants was observed in any of the above tabulated tests.

EXPERIMENTAL EXAMPLE 3

Synergistic effect test at growing period of weeds:

Pots having 12 cm in diameter were charged with paddy field soil containing many roots of Elleocharis acicularis var. longiseta, and 35 seeds of Panicum crusgalli were inoculated in the pot. When the Eleocharis acicularis var. longiseta growth reached the third foliage period (after two weeks), the pots were flooded to a depth of 3 cm and then treated with the chemicals. After two weeks, the controlling effects on Cyperus serotinus and Panicum crusgalli were investigated and the results were as in Table 4, in which compositions Nos. 1 and 2 are compositions of this invention.

Table 4

| No. | Sample Chemicals | Amount used Active ingredient content (per 10a) CBDC | CNP | Panicum crusgalli (number) | Broad-leaved weed (number) | Eleocharis acicularis (withering degree)** |
|---|---|---|---|---|---|---|
| 1 | Composition of Ex. 2 | 200 | 100 | 0 | 0 | 5 |
|   |   | 100 | 50 | 1 | 2 | 4.5 |
|   |   | 50 | 25 | 6 | 4 | 3.5 |
| 2 | Composition of Ex. 3 | 100 | 150 | 0 | 0 | 5 |
|   |   | 50 | 75 | 0 | 3 | 4.5 |
|   |   | 25 | 37.5 | 6 | 4 | 3 |
| 3 | CBDC * (Comparative Ex.) | 500 | — | 4 | 11 | 3.5 |
|   |   | 250 | — | 12 | 17 | 2 |
|   |   | 200 | — | 18 | 22 | 1 |
| 4 | CNP * (Comparative Ex.) | — | 200 | 24 | 16 | 1 |
|   |   | — | 150 | 25 | 19 | 0 |
|   |   | — | 100 | 30 | 24 | 0 |
|   |   | CBDC | CNP |   |   |   |
| 5 | Control(a) | — | — | 31 | 26 | 0 |
| 6 | Control(b) | — | — | 32 | 25 | 0 |
|   | Non-treatment | — | — | 32 | 27 | 0 |

Remarks:
*) Granules consisting of 10% of CBDC (or CNP) absorbed uniformly into 90% of granular diatomaceous earth and which passed through 8-32 mesh.
**) Cyperus serotinus withering

| 5 | 100% withering |
| 4 | 80% withering |
| 3 | 60% withering |
| 2 | 40% withering |
| 1 | 20% withering |
| 0 | 0% withering |

(a) Granules: 58% of bentonite, 40.5% of clay, 1.0% of sodium alkylbenzene sulfonate and 0.5% of PVA were uniformly crushed, mixed, a suitable amount of water added, and a granular formulation prepared in the same manner as in Example 1.

(b) Granules: 45% of calcium bicarbonate, 52.0% of clay, 1% of sodium alkylbenzene sulfonate and 2% of sodium lignine sulfonate were uniformly crushed, mixed, kneaded with a suitable amount of water, granulized by means of ana extrusion granulizer, dried, and thereafter passed through a 14-32 mesh to prepare the granular formulation.

EXPERIMENTAL EXAMPLE 4

Synergistic effect test at germination of weed:

Eleocharis acicularis var. longiseta and Panicum crusgalli at germination period, Panicum crusgalli at the first foliage period and the second foliage period, and aquatic rice plants at the third foliage period were respectively planted in pots having 15 cm in diameter.

After flooding to a depth of 3 cm, CNP granules alone, thiocarbamate granules alone, and a mixture of CNP and thiocarbamate granules (formulated as in Example 11) were scattered on the pots respectively by hand, and numbers and weights of germinating weeds and phytoxicity toward rice plants were investigated after 15 days after the treatment. The results were as in Table 5, in which Nos. 5-8 are compositions of this invention.

Table 5

| No. | Sample Chemicals | Amount used Kg/10a | Number of Eleocharis acicularis | Weight of panicum crusgalli (g) Treating at germination period | Treating at 1st foliage period | Treating at 2nd foliage period | Phytoxicity to rice plants |
|---|---|---|---|---|---|---|---|
| 1 | CNP 7% | 1(70)(a) | 56 | 1.4 | 3.2 | 8.4 | no |
|   |   | 2(140) | 41 | 0.5 | 1.8 | 6.3 | no |
|   |   | 3(210) | 29 | 0 | 1.4 | 5.1 | no |
| 2 | Compound 18 – 7% | 1(70) | 41 | 0.9 | 2.9 | 8.2 | no |
|   |   | 2(140) | 26 | 0.2 | 1.5 | 5.6 | no |
|   |   | 3(210) | 12 | 0 | 1.1 | 3.9 | no |
| 3 | Compound 21 – 7% | 1(70) | 52 | 0.8 | 2.6 | 7.2 | no |
|   |   | 2(140) | 27 | 0.3 | 1.2 | 5.1 | no |
|   |   | 3(210) | 9 | 0 | 0.9 | 3.5 | no |
| 4 | Compound 23 – 7% | 1(70) | 43 | 1.0 | 2.4 | 6.9 | no |
|   |   | 2(140) | 21 | 0.6 | 1.4 | 5.0 | no |
|   |   | 3(210) | 10 | 0 | 1.1 | 3.1 | no |
| 5 | Mixture CNP 7% Compound | 1(70:70)(b) | 9 | 0.2 | 0.5 | 2.0 | no |
|   |   | 2(140:140) | 0 | 0 | 0 | 0.8 | no |

Table 5—Continued

| No. | Sample Chemicals | Amount used Kg/10a | Number of Eleocharis acicularis | Weight of panicum crusgalli (g) | | | Phytoxicity to rice plants |
| --- | --- | --- | --- | --- | --- | --- | --- |
| | | | | Treating at germination period | Treating at 1st foliage period | Treating at 2nd foliage period | |
| 6 | 15 – 7% Mixture CNP 7% Compound | 3(210:210) 1(70:70) 2(140:140) | 0 8 1 | 0 0 0 | 0 0.8 0.1 | 0 1.9 0.6 | no no no |
| 7 | 18 – 7% Mixture CNP 7% Compound | 3(210:210) 1(70:70) 2(140:140) | 0 7 1 | 0 0.1 0 | 0 0.7 0.1 | 0 1.6 0.4 | no no no |
| 8 | 21 – 7% Mixture CNP 7% Compound | 3(210:210) 1(70:70) 2(140:140) | 0 13 3 | 0 0. 0 | 0 0.8 0.2 | 0 2.1 0.5 | no no no |
| 9 | 23 – 7% Control[r] | 3(210:210) 3 (–) | 0 67 | 0 8.1 | 0 4.7 | 0 8.5 | no no |
| 10 | Non-treatment | | 68 | 8.3 | 4.7 | 8.8 | no |

Remarks:
[a]: Amount of active ingredient used in g/10a.
[b]: Amount of active ingredient used in g/10a (thiocarbamate: CNP).
[r]: Granules: 12% of white carbon (colloidal silica), 86% of bentonite and 2% of sodium lignin sulfonate were uniformly crushed, mixed, blended with a suitable amount of water, granulized by means of an extrusion granulizer, dried and prepared into a granular formulation having particle sizes 14–32 mesh.

EXPERIMENTAL EXAMPLE 5

Herbicidal test by continuous treatment after sowing Panicum crusgalli:

A polybutt (a polyethylene tray) having a volume of 800 $cm^3$ was charged with paddy field soil containing Eleocharis acicularis var. longiseta root, and 50 seeds of Panicum crusgalli were inoculated in the pot. The chemical treatment was conducted at every growing stage of Panicum crusgalli and Eleocharis acicularis var. longieseta, that is, just after sowing Panicum crusgalli, after five days, ten days, and fifteen days.

The investigation was carried out two weeks after each treatment. The sample chemicals used in the composition of the invention are granules containing 5% of CBDC and 5% of CNP, and the comparative chemicals are 10% CBDC granules and 7% CNP granules. The results were as in Table 6, in which No. 1 is the compositions of this invention.

In Table 6, stages A, B, C and D are the stages of weed growth just after sowing Panicum crusgalli (A), after five days (B), ten days (C), and fifteen days (D). Grass height in A is 0 cm, 0 cm, that in B is 2cm, 0.3cm, that in C is 5cm, 12cm, and that in D is 8cm, 23cm. Further, a and b, respectively, are the numbers of Panicum crusgalli and Eleocharis acicularis var. longiseta CBDC and CNP granules used alone are remarkably inferior in herbicidal effects on growing weeds. However, the composition of the invention can kill weeds without regard to such stages.

EXPERIMENTAL EXAMPLE 6

Herbicidal effect test 15 days after rice-transplantation:

Paddy field soil 15 days after transplantation was divided into 20 $m^2$ (4×5 m) area per block, and granules comprising compound (17) and CNP (formulated as in Examples 11, 12 and 13, as indicated) and were applied in the amount of 2kg and 4kg per 10 are 20 days after the treatment, the numbers of weeds generated in 1 $m^2$ of area within the tested block were investigated and simultaneously phytoxicity against the aquatic rice plants was investigated. The results were as in Table 7, in which Nos. 1–3 are the compositions of this invention.

Table 6

| No. | Sample Chemicals | Amount used kg/10a | Stage A | | Stage B | | Stage C | | Stage D | |
| --- | --- | --- | --- | --- | --- | --- | --- | --- | --- | --- |
| | | | a | b | a | b | a | b | a | b |
| 1 | Composition of Ex. 5 | 1 (50:50) 2 (100:100) 3(150:150) | 24 5 0 | 10 5 0 | 19 8 0 | 16 4 1 | 38 8 0 | 20 6 2 | 36 13 3 | 23 12 4 |
| 2 | CBDC 10% (control) | 1(100) 2(200) 3(300) | 46 32 12 | 36 24 7 | 47 37 16 | 77 17 9 | 47 40 27 | 81 68 41 | 47 45 38 | 81 57 57 |
| 3 | CNP 7% (control) | 1(70) 2(140) 3(210) | 38 10 0 | 80 60 36 | 50 42 32 | 73 61 50 | 45 40 41 | 90 82 53 | 50 47 45 | 90 86 78 |
| 4 | Control (b) | 3 (–) | 46 | 83 | 59 | 74 | 46 | 93 | 56 | 92 |
| 5 | Non-treatment | – | 48 | 86 | 59 | 78 | 51 | 93 | 58 | 93 |

Remarks:
(a): Amount of active ingredient used in g/10a.
(b): Granules: 43% of clay, 55% of bentonite, 1.5% of calcium alkylbenzene sulfonate and 0.5% of PVA were uniformly crushed, mixed, kneaded with a suitable amount of water, granulized by means of an extrusion granulizer, dried and thereafter conducted to 14–32 mesh to prepare the granular formulation.

Table 7

| No. | Sample Chemicals | Amount kg/10a | Panicum crus-galli | Cyperus micro-iria | Mono-choria vaginalis | Eleo-charis acicu-laris | Phyto-xicity to Rice plants |
|-----|------------------|---------------|--------------------|--------------------|-----------------------|-------------------------|-----------------------------|
| 1 | Compound 17 – 7% + CNP 7% (Ex. 11) | 2 (140:140) | 0 | 1 | 3 | 4 | no |
|   |                  | 4 (280:280)   | 0 | 0 | 0 | 0 | no |
| 2 | Compound 17 – 10% + CNP 5% (Ex. 12) | 2 (200:100) | 0 | 1 | 0 | 0 | no |
|   |                  | 4 (400:200)   | 0 | 0 | 0 | 0 | no |
| 3 | Compound 17 – 5% + CNP 6% (Ex. 13) | 2 (100:120) | 1 | 2 | 5 | 0 | no |
|   |                  | 4 (200:240)   | 0 | 0 | 0 | 0 | no |
| 4 | Comparative single chemical (CNP) 7% | 2 (140)[b] | 21 | 20 | 21 | 52 | no |
|   |                  | 4 (280)       | 18 | 14 | 13 | 42 | no |
| 5 | NIP granules 7% (commercial) | 2 (140) | 24 | 22 | 28 | 53 | no |
|   |                  | 4 (280)       | 21 | 17 | 16 | 41 | no |
| 6 | Control (c)      | 4 (—)         | 28 | 29 | 32 | 59 | no |
| 7 | Control (d)      | 4 (—)         | 26 | 22 | 30 | 59 | no |
| 8 | Control (e)      | 4 (—)         | 27 | 21 | 32 | 57 | no |
| 9 | Nontreatment     |               | 28 | 21 | 31 | 58 | no |

(a) Amount of active ingredient used in g/10a (thiocarbamate: CNP)
(b) Amount of active ingredient used (g/10a).
(c) Granules: 52% of white carbon (colloidal silica), 86% of bentonite and 2% of sodium lignin sulfonate were uniformly crushed, mixed, blended with a suitable amount of water, granulized by means of an extrusion granulizer, dried and prepared into a granular formulation having 14-32 mesh.
(d) Granules: 58% of bentonite, 40.5% of clay, 1% of sodium alkylbenzene sulfonate and 0.5% of PVA were uniformly crushed, mixed, blended with a suitable amount of water and granulized in the same manner as in (c).
(e) Granule: 47.5% of calcium bicarbonate, 49.5% of clay, 1% of sodium alkylbenzene sulfonate and 2% of sodium lignine sulfonate were combined and treated, in the same manner as in (c) to prepare a granular formulation.

EXPERIMENTAL EXAMPLE 7

Paddy soil of field test diluvian valcanic ash soil 20 days after rice-transplantation was used. Under a water-decreasing depth of about 3 cm per day, scarification was carried out on June 20, and the rice plants were transplanted at a rate of three plants per stub in the conventional way. At the 20th day, the fields were treated with granules of varying ingredients as shown in Table 8.

The investigation was carried out by cutting a branch thereof at the 30th day after the treatment. In addition, Eleocharis acicularis var. longiseta, previously cultured, was transplanted to a test field at a rate of 10 spots per 1 $m^2$, and seed of Panicum crusgalli was mixed onto the surface layer to a depth of 1–3cm at the time of scarifying to arrange the generation of weeds.

The extent of weed control is shown in percent by weight as compared with the weight of living grass in a non-treated block to (control = 0% in non-treated block), and the results were as in Table 8, in which Nos. 1–3 are compositions of this invention prepared by the method of Example 1.

Table 8

| No. | Chemicals Name | | Chemicals Amount used kg/10a | Results at the 30th day | | Phytoxicity to aquatic rice plants |
|-----|----------------|---|------------------------------|--------------------------|---|-----------------------------------|
|     |                |   |                              | A | B |                                   |
| 1 | CBDC | 7% | 3(210:180)[a] | 85 | 85 | no |
|   | CNP  | 6% | 4(280:240)    | 98 | 93 | no |
| 2 | CBDC | 10% | 3(300:120)   | 86 | 82 | no |
|   | CNP  | 4%  | 4(400:160)   | 96 | 94 | no |
| 3 | CBDC | 5%  | 3(150:150)   | 80 | 83 | no |
|   | CNP  | 5%  | 4(200:200)   | 95 | 90 | no |
| 4 | CNP granules control | 7% | 3(210)[b] | 10 | 5 | no |
|   |                      |    | 4(280)    | 15 | 10 | no |
| 5 | NIP granules (control) |  | 3(210) | 8 | 6 | no |
|   |                        | 7% | 4(280) | 15 | 10 | no |
| 6 | Control[c] |   | 4 (—) | 0 | 0 | no |
| 7 | Non-Treatment |   |       | 0 | 0 | no |

Remarks:
(a) Amount of active ingredient used in g/10 ares (CBDC:CNP)
(b) Amount of active ingredient used (g/10 ares)
(c) Granules: 12% of white carbon (colloidal silica), 86% of bentonite and 2% of sodium lignin sulfonate were uniformly crushed, mixed, kneaded with a suitable amount of water, granulized by means of an extrusion granulizer, dried and thereafter conducted to 14-32 mesh to prepare a granular formulation.

In the Table, A is the herbicidal effect against broad-leaved weeds of Panicum crusgalli, and B is the herbicidal effect against Cyperus serotinus.

EXPERIMENTAL EXAMPLE 8

Herbicidal effect test on the 20th day after rice-transplantation:

Paddy field soil on the 20th day after rice-transplantation was divided into 10 $m^2$ of area per block and a mixture of compound 14 with CNP (formulated according to Examples 13, 14 and 15, as indicated) were applied at a rate of 2Kg and 3Kg per 10 ares. After the 30th day, the numbers of weed generated in an area of 1 $m^2$ of the test block were investigated and simultaneously phytoxicity against aquatic rice plants was observed. The results were as in Table 9, in which Nos. 1–3 are the compositions of this invention.

EXPERIMENTAL EXAMPLE 9

Synergistic effect test at initial germination period of weeds:

Eleocharis acicularis var. longiseta and Panicum crusgalli at germination period, Panicum crusgalli at the first foliage period and the second foliage period, and aquatic rice plants at the third foliage period respectively were planted in pots having 15 cm in diameter. After flooding to a depth of 3 cm, NCFE granules alone, thiocarbamate granules (formulated as in Example 1) were scattered on the pots respectively by hand. The numbers and weight of germinating weeds and phytoxicity against aquatic rice plants were investigated 15 days after the treatment. The results were as in Table 10, in which Nos. 4 and 5 are the composition of this invention.

Table 9

| No. | Sample Chemicals | Amount kg/10a | Number of generating weeds | | | Eleocharis acicularis | Phytoxicity to rice plants |
| | | | Panicum crusgalli | Cyperus microiria | Monochoria vaginalis | | |
| --- | --- | --- | --- | --- | --- | --- | --- |
| 1 | Compound 14 – 3% + CNP 7.5% (Ex. 13) | 2(100:150) (a) | 5 | 8 | 2 | 1.2 | no |
| | | 3(150:225) | 1 | 2 | 0 | 0.3 | no |
| 2 | Compound 14 – 5% + CNP 6% (Ex. 14) | 2(100:200) | 5 | 5 | 3 | 1.8 | no |
| | | 3(150:180) | 2 | 1 | 0 | 0.4 | no |
| 3 | Compound 14 – 5% + CNP 5% (Ex. 15) | 2(100:100) | 5 | 4 | 2 | 1.4 | no |
| | | 3(150:150) | 2 | 2 | 0 | 0 | no |
| 4 | CNP granule 7% (commercial) | 4(280) (b) | 27 | 32 | 20 | 41.8 | no |
| | | 6 (420) | 19 | 23 | 12 | 27.0 | |
| 5 | Control c) | 3 (–) | 35 | 39 | 32 | 54.3 | no |
| 6, | Control d) | 3 (–c) | 34 | 37 | 30 | 53.2 | no |
| 7 | Control e) | 3 (–) | 34 | 40 | 30 | 55.2 | no |
| 8 | Non-Treatment | | 35 | 40 | 31 | 55.8 | no |

Remarks:
(a) Amount of active ingredient used in g/10a (thiocarbamate:CNP)
(b) Amount of active ingredient used (g/10a).
(c) Granules 47.5% of calcium bicarbonate, 49.5% of clay, 1% of sodium alkylbenzene sulfonate and 2% of sodium lignine sulfonate were uniformly crushed, mixed, blended with a suitable amount of water, granulized by means of an extrusion granulizer, dried and prepared into a granular formulation having 14–32 mesh particle size.
(d) Granules: 45% of calcium bicarbonate 51.5% of clay, 1.5% of sodium alkylbenzene sulfonate and 2% of sodium lignine sulfonate were treated in the same manner as in (c) to make the granular formulation.
(e) Granules: 55% of bentonite, 43% of clay, 1.5% of calcium alkylbenzene sulfonate and 0.5% of PVA were treated in the same manner as in (c) to make the granular formulation.

Table 10

| No. | Sample Chemicals | Amount used kg/10a | Number of Eleocharis acicularis | Weight of Panicum crusgalli (g) | | | Phytoxicity to rice plants |
| | | | | Treating at germination period | Treating at 1st foliage period | Treating at 2nd foliage period | |
| --- | --- | --- | --- | --- | --- | --- | --- |
| 1 | NCFE 1.5% | 1(15)(a) | 59 | 1.9 | 3.0 | 9.6 | no |
| | | 2(30) | 42 | 1.1 | 2.3 | 8.1 | no |
| | | 3(45) | 28 | 0.4 | 1.9 | 6.4 | no |
| 2 | Compound 2 – 1.5% | 1(70) | 36 | 2.4 | 3.0 | 7.6 | no |
| | | 2(140) | 25 | 1.3 | 1.9 | 6.3 | no |
| | | 3(210) | 10 | 0.5 | 1.4 | 4.1 | no |
| 3 | CBDC 7% | 1 (70) | 20 | 0.8 | 1.8 | 6.8 | no |
| | | 2 (140) | 15 | 0.2 | 1.1 | 5.1 | no |
| | | 3 (210) | 3 | 0 | 0.6 | 3.9 | no |
| 4 | Mixture (d) NCFE 1.5% Compound 2 – 7% | 1 (50:15)(b) | 4 | 0.6 | 1.4 | 2.6 | no |
| | | 2(100:30) | 0 | 0.1 | 0.3 | 1.1 | no |
| | | 3(150:45) | 0 | 0 | 0 | 0 | no |

Table 10—Continued

| No. | Sample Chemicals | Amount used kg/10a | Number of Eleocharis acicularis | Weight of Panicum crusgalli (g) Treating at germination period | Treating at 1st foliage period | Treating at 2nd foliage period | Phytoxicity to rice plants |
|---|---|---|---|---|---|---|---|
| 5 | Mixture (e) | 1(70:15)[c] | 2 | 0 | 1.1 | 1.4 | no |
|   | NCFE 1.5% | 2(140:30) | 0 | 0 | 0.2 | 0.2 | no |
|   | CBDC 7 % | 3(210:45) | 0 | 0 | 0 | 0 | no |
| 6 | Control (f) | 3 (−) | 82 | 3.4 | 4.8 | 9.6 | no |
| 7 | Non-treatment |  | 79 | 3.6 | 4.8 | 9.9 | no |

Remarks:
(a) Amount of active ingredient used (g/10a).
(b) Amount of active ingredient used in g/10a (CPD 2: NCFE)
(c) Amount of active ingredient used in g/10a (CBDE:NEFE)
(d) Granules: 1.5% of NCFE, 5% of compound (2), 2% of sodium lignine sulfonate, 5% of white carbone (colloidal silica) and 86.5% of bentonite were uniformly crushed, mixed, kneaded with a suitable amount of water, granulized by means of an extrusion granulizer, dried and thereafter conducted to 14–32 mesh to prepare the granular formulation.
(e) Granules: 1.5% of NCFE, 7% of CBDC, 2% of sodium lignine sulfonaate, 5% of white carbon (colloidal silica) and 84.5% of bentonite were treated in the same manner as in (d) to make the granular formulation.
(f) Granules: 93% of bentonite, 5% of white carbon (Ocolloidal silica) and 2% of sodium lignine sulfonate were treated in the same manner as in (d) to make the granular formulation.

EXPERIMENTAL EXAMPLE 10

Herbicidal effect test on the 20th day after rice-transplantation:

Paddy field soil on the 20th day after rice-transplantation was divided into areas of 10 $m^2$ per block, and granules comprising a mixture of compound (12) with NCFE was applied at rates of 2Kg and 4Kg per 10 ares. Numbers of weeds generated in the area of 1 $m^2$ of test block were investigated after the 30th day and simultaneously phytoxicity against aquatic rice plants was tested. The results were as in Table 11, in which No. 1 is the composition of the present invention.

Table 11

| No. | Sample Chemicals | Amount used kg/10a | Number of generating weeds Panicum crusgalli | Cyperus microiria | Monochoria vaginalis | Elocharis acicularis (g) | Phytoxicity to rice plants |
|---|---|---|---|---|---|---|---|
| 1 | Compound 12 − 5% + NCFE 1.5% (b) | 2 (100:30)[a] | 4 | 7 | 4 | 3.2 | no |
|   |   | 4(200:60) | 0 | 0 | 0 | 0.4 | no |
| 2 | Comparative single chemical 1.5% (NCFE) | 2(0:30) | 26 | 44 | 14 | 54.3 | no |
|   |   | 4(0:60) | 18 | 26 | 7 | 26.0 | no |
| 3 | control (c) | 4(0:0) | 30 | 73 | 26 | 69.5 | no |
| 4 | Non-Treatment |  | 31 | 70 | 26 | 70.3 | no |

Remarks:
(a) Amount of active ingredient used in g/10a (CPD 12: NCFE)
(b) Granule: 5% of compound (12), 1.5% of NCFE, 2% of sodium lignine sulfonate, 5% of white carbon (colloidal silica) and 86.5% of bentonite were uniformly crushed, mixed, blended with a suitable amount of water, granulized by means of an extrusion granulizer, dried and prepared into a granular formulation having 1–32 mesh particle size.
(c) Granule: 2% of sodium lignine sulfonate, 5% of white carbon and 93% of bentonite were treated in the same manner as in (b) to make the granular formulation.

What is claimed is:

1. A mixed herbicide composition which comprises as an active ingredient, a herbicidal effective amount of a mixture of a thiocarbamate compound of the formula:

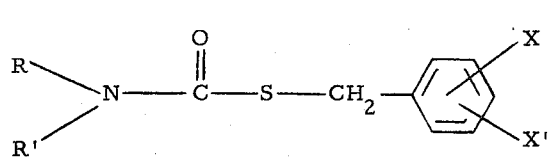

wherein R and R' each represent a member selected from the group consisting of a $C_1-C_4$ alkyl group, or R and R' are each a propenyl group, or R and R' form a member selected from the group consisting of a piperidine ring and a morpholine ring together with a nitrogen atom; X and X' each represent a member selected from the group consisting of a hydrogen atom, a halogen atom, a methyl group and a $C_1-C_2$ alkoxy group; and either 4-nitro-2', 4', 6-trichlorodiphenyl ether or 4-nitro-2', 4'-dichloro-6'-fluorodiphenyl ether; and an inert carrier, the thiocarbamate and ether compounds being present in a weight ratio of from 0.3 − 3:1.0.

2. A herbicide composition as claimed in claim 1, in which the thiocarbamate compound is a compound of the formula

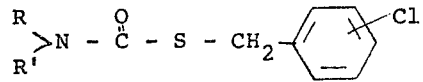

wherein R and R' are each lower alkyl.

3. A herbicide composition as claimed in claim 1, in which the thiocarbamate compound is a compound of the formula

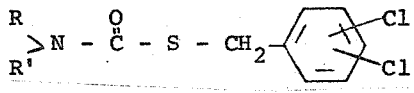

wherein R and R' are each lower alkyl.

4. A herbicide composition as claimed in claim 1, in which the thiocarbamate compound is a compound of the formula

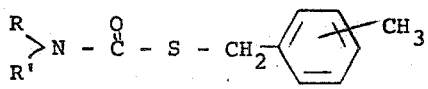

wherein R and R' are each lower alkyl.

5. A granular herbicide composition as claimed in claim 1 in which the inert carrier is an inert solid carrier.

6. The composition of claim 1, wherein said thiocarbamate compound and said ether are both present in an amount ranging from 50–500 grams.

7. A method for controlling weeds, which comprises applying to said weeds, a herbicidal effective amount of a mixture of a thiocarbamate compound of the formula

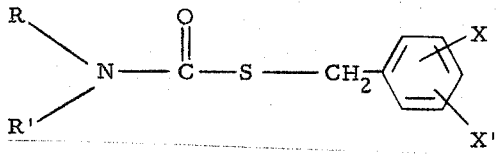

wherein R and R' each represent a member selected from the group consisting of a $C_1-C_4$ alkyl group, or R and R' are each a propenyl group, or R and R' form a member selected from the group consisting of a piperidine ring and a morpholine ring together with a nitrogen atom; X and X' each represent a member selected from the group consisting of a hydrogen atom, a halogen atom, a methyl group and a $C_1-C_2$ alkoxy group; and either 4-nitro-2', 4', 6'-trichlorodiphenyl ether or 4-nitro-2', 4'-dichloro-6-fluorodiphenyl ether; and an inert carrier, the thiocarbamate and ether compounds being present in a weight ratio of from 0.3–3:1.0.

8. The method as claimed in claim 7 which comprises applying said mixture to paddy field soil.

9. The method as claimed in claim 7, which comprises using S-(4-chlorobenzyl) N,N-diethyl thiocarbamate as the thiocarbamate compound.

10. The method claim 7, wherein said thiocarbamate compound and said ether are both present in an amount ranging from 50–500 grams.

* * * * *